(12) United States Patent
Broyd et al.

(10) Patent No.: US 10,394,896 B2
(45) Date of Patent: **\*Aug. 27, 2019**

(54) IDENTIFYING RELATIONSHIPS OF INTEREST OF ENTITIES

(71) Applicant: International Business Machines Corporation, Armonk, NY (US)

(72) Inventors: Gary J. Broyd, Mepal (GB); Robert L. Kerr, Cambridge (GB); Michael P. Kirwan, Cambridge (GB); Dominique Martindale, Cambridge (GB)

(73) Assignee: International Business Machines Corporation, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/875,806

(22) Filed: Jan. 19, 2018

(65) Prior Publication Data

US 2018/0150573 A1 May 31, 2018

Related U.S. Application Data

(63) Continuation of application No. 15/362,091, filed on Nov. 28, 2016.

(51) Int. Cl.
  *G06F 16/903* (2019.01)
  *G06F 16/907* (2019.01)
  *G06F 16/28* (2019.01)
(52) U.S. Cl.
  CPC ...... *G06F 16/90335* (2019.01); *G06F 16/288* (2019.01); *G06F 16/907* (2019.01)
(58) Field of Classification Search
  None
  See application file for complete search history.

(56) References Cited

U.S. PATENT DOCUMENTS 9,116,982 B1   8/2015  Stern et al.
9,208,223 B1 \* 12/2015  Patil ................. G06N 5/022
(Continued)

FOREIGN PATENT DOCUMENTS

WO    2007059034 A1    5/2007
WO    2015161899 A1    10/2015

OTHER PUBLICATIONS

List of IBM Patents or Patent Applications Treated as Related, Jan. 19, 2018, pp. 1-2.

(Continued)

*Primary Examiner* — Richard L Bowen
(74) *Attorney, Agent, or Firm* — Winstead, P.C.

(57) ABSTRACT

A method, system and computer program product for identifying relationships of interest of entities in a data modeling environment, where the data modeling environment represents objects as entities with links representing relationships between the entities. A query is received, where the query includes entity(ies) and link(s) with at least one of the entities or links designated as an output item. The query is analyzed to identify each dumbbell in the query, where a dumbbell is a link with a first entity at a first end of the link and a second entity at a second end of the link. Each identified dumbbell is examined to determine if the dumbbell includes an output item; and, if the dumbbell includes an output item, adding the dumbbell to a catalogue of relationships if a dumbbell is not already listed having the link type and entity types of the identified dumbbell.

10 Claims, 10 Drawing Sheets

(56) References Cited

U.S. PATENT DOCUMENTS

| | | | |
|---|---|---|---|
| 9,881,066 B1* | 1/2018 | Yousaf | G06F 3/0482 |
| 2007/0027851 A1* | 2/2007 | Kruy | G06F 17/30398 |
| 2007/0266041 A1* | 11/2007 | Beckman | G06F 17/30604 |
| 2009/0083211 A1 | 3/2009 | Sinha et al. | |
| 2009/0259659 A1 | 10/2009 | Mericle | |
| 2010/0228693 A1* | 9/2010 | Dawson | G06F 17/2705 |
| | | | 706/12 |
| 2012/0054226 A1* | 3/2012 | Cao | G06F 17/30716 |
| | | | 707/769 |
| 2012/0197849 A1* | 8/2012 | Srinivasa | G06F 17/30522 |
| | | | 707/687 |
| 2013/0139125 A1* | 5/2013 | McCoy | G06F 8/20 |
| | | | 717/104 |
| 2013/0298050 A1 | 11/2013 | Emanuel et al. | |
| 2016/0063993 A1* | 3/2016 | Dolan | G10L 15/08 |
| | | | 704/254 |
| 2016/0210337 A1* | 7/2016 | Constandt | G06Q 10/10 |
| 2017/0161325 A1* | 6/2017 | Rastogi | G06F 17/30433 |
| 2017/0185696 A1* | 6/2017 | Hawkes | G06F 17/30 |

OTHER PUBLICATIONS

Office Action for U.S. Appl. No. 15/362,091 dated Sep. 28, 2018, pp. 1-23.
Office Action for U.S. Appl. No. 15/362,091 dated Feb. 8, 2019, pp. 1-22.

* cited by examiner

FIG. 5A

```
┌─────────────────────────────────────────────┐
│              CLIENT UI 150                  │
│                                             │
│  510 — ADVANCED FACETS                      │
│                                             │
│  520 — VEHICLE                              │
│  521 — [ ]  OWNER OF VEHICLE           99   │
│                                             │
│  530 — CRIME                                │
│  531 — [ ]  OFFENDER OF CRIME: ASSAULT  64  │
│  532 — [ ]  OFFENDER OF CRIME: BURGLARY 34  │
│  533 — [ ]  OFFENDER OF CRIME: THEFT    32  │
│                                             │
│                                             │
│  540 — STANDARD FACETS                      │
│                                             │
│  550 — GENDER                               │
│  551 — [ ]  MALE                        84  │
│  552 — [ ]  FEMALE                      16  │
│                                             │
│  560 — NATIONALITY                          │
│  561 — [ ]  BRITISH                     96  │
│  562 — [ ]  FRENCH                       4  │
│                                             │
└─────────────────────────────────────────────┘
```

IDENTIFYING RELATIONSHIPS OF INTEREST OF ENTITIES

TECHNICAL FIELD

The present invention relates generally to identifying relationships of interest of entities, and more particularly to identifying relationships of interest of entities in a data analysis environment.

BACKGROUND

In a rich data environment in which entities, links, and properties (ELP) data needs to be searched, facets can assist with the filtering of matching results. In most faceting user interfaces, facets are generated from properties and metadata of the items listed and the list of available facets can be navigated via scrolling.

In an ELP data environment, facets can also be generated from linked entities and their properties. For example, a search for "John Smith" could return a list of matching person entities. Facets generated by legal end types specified by a schema could include "Linked to crime" or more specifically "Linked to crime: assault".

Given this capability, in a law enforcement deployment of a schema, the number of potential combinations of advanced facets could easily reach the 1000s and become unusable if presented to the user in their entirety. Consequently, configuration is required to ensure the user is only presented with advanced facets that are useful.

In order to make the most of this capability, there is either a configuration overhead for the administrator or an interaction overhead for the user.

SUMMARY

In one embodiment of the present invention, a computer-implemented method for identifying relationships of interest of entities in a data modeling environment comprises receiving a query, where the data modeling environment represents objects as entities with links representing relationships between the entities and where the query comprises one or more entities and one or more links with at least one of the entities or links designated as an output item. The method further comprises analyzing, by a processor, the query to identify each dumbbell in the query, wherein a dumbbell is a link with a first entity at a first end of the link and a second entity at a second end of the link. The method additionally comprises examining, by the processor, each identified dumbbell to determine if the dumbbell includes an output item. Furthermore, the method comprises adding the dumbbell to a catalogue of relationships including a link type and entity types of the dumbbell in response to the dumbbell including an output item.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIGS. 5A and 5B are schematic diagrams illustrating an example user interface with advanced facets in accordance with an aspect of the present invention;

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and a system are provided for identifying relationships of interest of entities. Information may be expressed in terms of entities, links, and properties (ELP) that may be analyzed using data models. For example, a data model may provide a platform for manipulating and storing types of entities, links, and properties as controlled by a deployment-specific schema.

An example of a data model environment is IBM i2 Analyze (IBM and i2 are trademarks of International Business Machines Corporation) that is an enterprise intelligence analysis environment that facilitates information sharing and intelligence production with the flexibility of both web-based and rich desktop clients. It accelerates analysis of large volumes of data through an extensible, service-oriented environment, designed to integrate into existing enterprise infrastructure, and simplify database connectivity. i2 Analyze supports operational analysis and improves situational awareness by providing faster, more informed decision making across and inside organizations.

The described method and system enables a user to create and save a query that is harvested to capture relationships between entities that may be deemed of interest. The method and system may use the types of link to obtain advanced facets for searching on the query.

Figure 1:
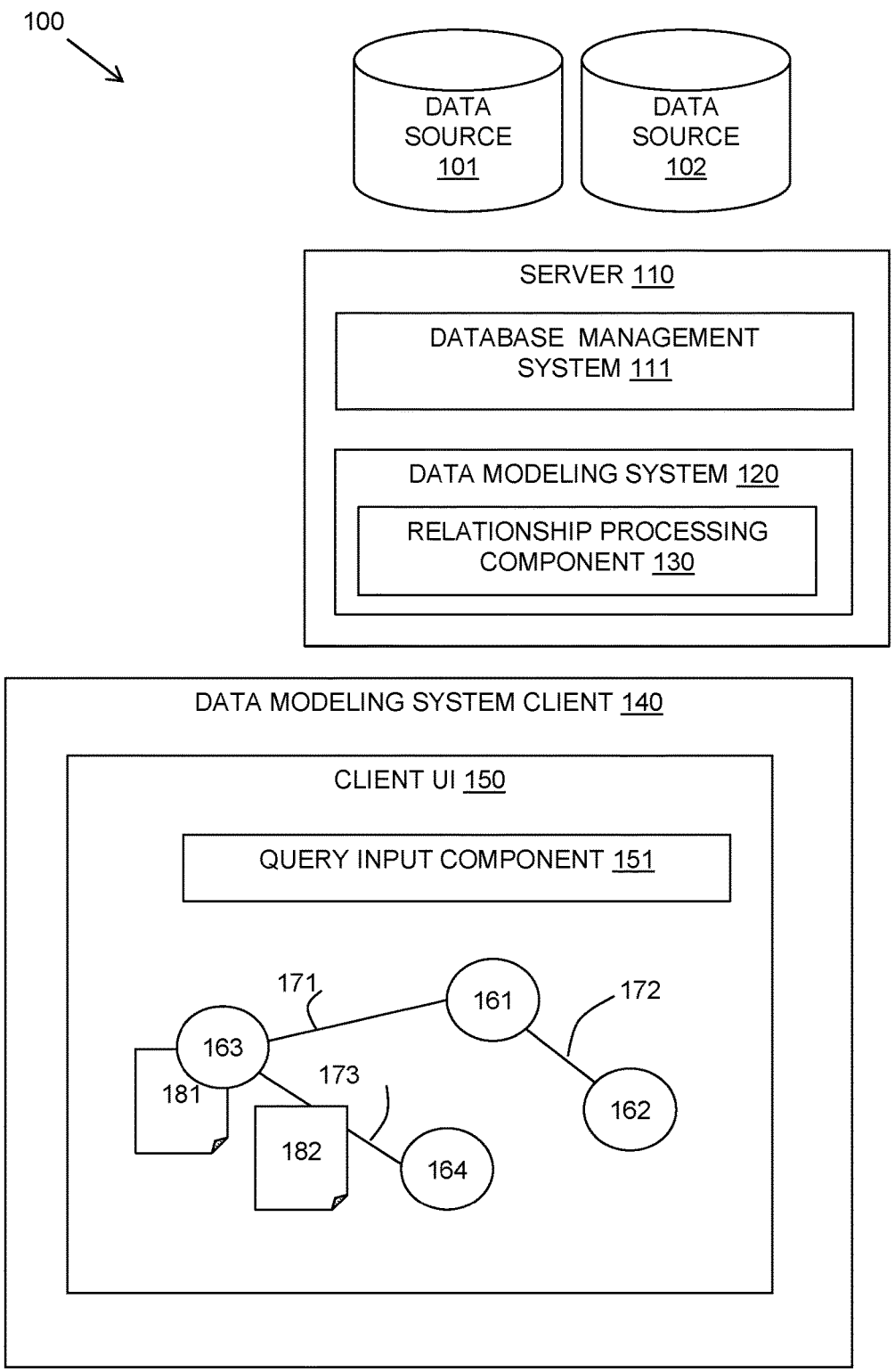
FIG. 1 is a block diagram illustrating an example embodiment of a system in which the present invention may be implemented.

Referring to FIG. 1, a block diagram illustrates an example embodiment of a system 100 in which the described method may be implemented. The system 100 may include a data modeling system 120 for providing data visualization and a database management system 111 with access to data sources 101, 102 from which data may be retrieved.

The data modeling system 120 and database management system 111 may be provided on one or more servers 110 for provision as a web-based system with a data modeling system client 140 which may be a rich desktop client providing a client user interface (UI) 150.

The described data modeling system 120 includes a relationship processing component 130 for providing the described functionality of relationship analysis and provision of advanced facets based on relationship types.

The client UI 150 may include a query input component 151 for receiving input of a user query as described further below. The client UI 150 may display a generated data model of retrieved data from the data sources 101, 102 including entities 161-164, links 171-173, and properties 181, 182 of the entities and links. Data connectors may be used to acquire data from the data sources 101, 102 and may convert requested data into entities 161-164, links 171-173, and properties 181, 182 to be displayed to the user in the client UI 150.

In a described data model environment, entities, links, and properties are defined as follows. Entities and links may be referred to as items.

An "entity" represents an object. This may be a real world physical object such as a "Person" or a "Car", or a conceptual object, such as a "Meeting" or an "Insurance Claim".

A "link" associates two entities with each other. For example, a "Person" entity might be associated with a "Car" entity through an "Owns" link.

A "property" stores a value that characterizes an entity or a link. For example, a "Person" entity might have properties that record its given name, surname, date of birth, and hair color.

The simplest relationship in an ELP data model involves two entities that are connected with a single link. These kinds of relationships are the building blocks for data structures that contain chains and networks of entities with any number of links between them. Because of what these relationships look like when they appear in visualizations, the structure is sometimes called a "dumbbell".

Figure 2A:
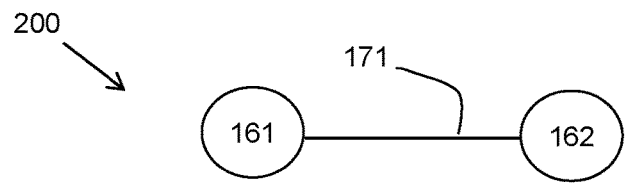
FIGS. 2A and 2B are schematic diagrams illustrating linked entities in accordance with aspects of the present invention.
Figure 2B:
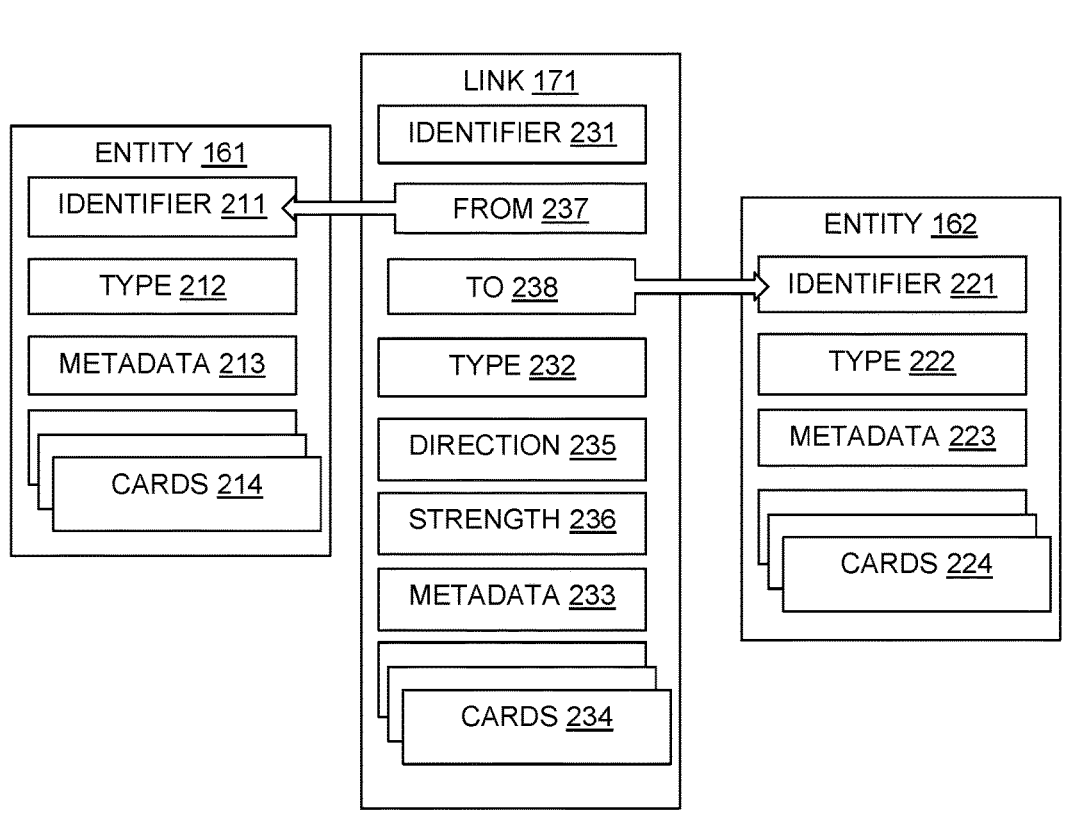

Referring to FIGS. 2A and 2B, schematic diagrams 200, 250 show a dumbbell formed of two entities 161, 162 with a link 171. For example, the first entity 161 may be a person of name "Anna Harvey" with a date of birth of "May 5, 1974" and the second entity may be a car of manufacture "Ford", make "Mondeo" (Ford and Mondeo are trademarks of Ford Motor Company), year "2007". The link 171 may indicate that the person "owns" the car. The properties may be stored in cards as illustrated in FIG. 2B.

FIG. 2B shows that the first entity 161 and the second entity 162 each have an identifier 211, 221 that is unique within a deployment of the platform, a type 212, 222 which determines what properties the entity can have, and metadata 213, 223 such as the time when the entity was created and modified. The entities 161, 162 may store their properties in one or more cards 214, 224 that they contain. Usually, a card contains properties whose values were supplied by a single source at a particular time. Different cards for a single entity may come from different sources. The cards themselves may have an identifier and metadata.

The link 171 between two entities 161, 162 may also include an identifier 231, a type 232, metadata 233 and cards 234. In addition, the link 171 includes an indication of the entity 161 the link is from 237 and the entity 162 the link is to 238 such that the link 171 has a direction. In addition, a link 171 may include a direction 235 and a strength 236.

The types 212, 222, 232 for entities and links are defined by the schema and the type categorizes the host and determines the categories it can have. A link type is similar to an entity type but contains more information. The link type also specifies what types of entities can be at the ends of that link.

Figure 3:
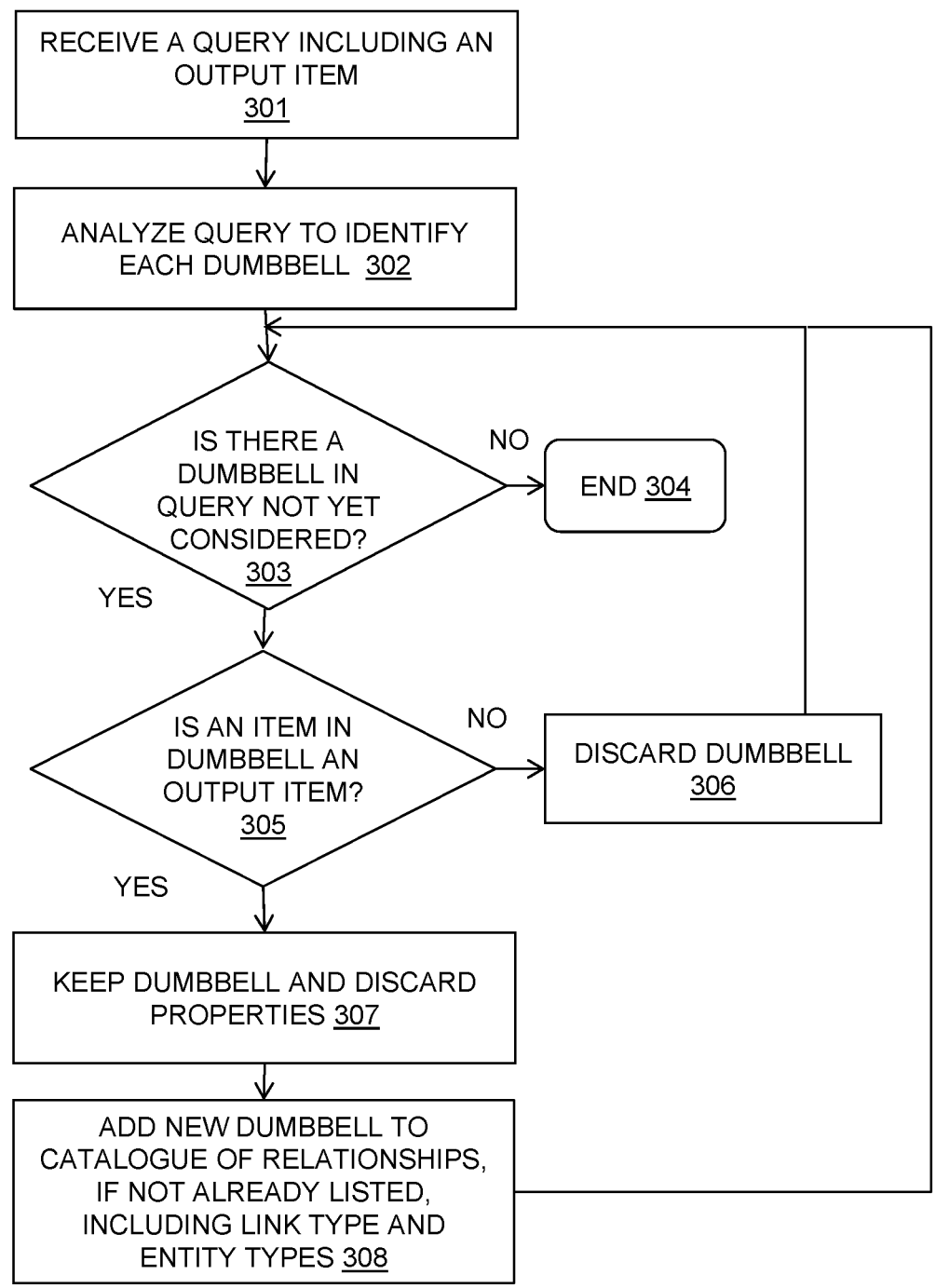
FIG. 3 is a flow diagram of a first example embodiment of a method in accordance with the present invention.

Referring to FIG. 3, a flow diagram 300 shows an example embodiment of the described method.

The method identifies links representing relationships of interest in a data modeling system. The data modeling system may represent objects as entities with links representing relationships between the entities. Entities and links are referred to as items. A link joining two entities is referred to as a dumbbell.

The method may receive 301 a query, the query comprising one or more entities and, optionally, one or more links. The query may be created and saved by a user of the data modeling system. In a saved query, one or more of the items (i.e. an entity or a link) is designated as an output item. An output item may be interpreted as being of significant interest as the query returns items of these types to the user. An output item determines the item type that will be returned by the response to the query.

The query may be analyzed 302 to identify each dumbbell in the query.

It may be determined 303 if there is a dumbbell in the query that has not already been considered. If there are no dumbbells that have not already been considered, then the method may end 304.

If there is a dumbbell that has not already been considered, it may be examined to determine 305 if the dumbbell includes an output item in the form of the dumbbell's link or one of the end entities.

If the dumbbell does not include an output item, the dumbbell may be discarded 306 as the identified relationship does not contain an item to be returned in the query.

If the dumbbell does include an output item, then the dumbbell is kept 307 and the property values of the items of the dumbbell are discarded. The property values are discarded as, when relationships are surfaced in other parts of the application, the property values will not be relevant.

A kept dumbbell, including the link type and entity types, may be added 308 to a catalogue of relationships if a dumbbell is not already listed having the link type and entity types. A catalogue may be any data structure that stores relationships, for example, person-offender-crime. The method may then loop to determine 303 if there is another dumbbell in the query that has not yet been considered.

The method may be repeated for each saved query so as to generate a list of relationships for each item type. A list of relationships may be generated for all saved queries input via the user interface. Alternatively, a list of relationships may be generated for saved queries for a specified user of the user interface.

These lists may be used when a user runs a keyword search and is presented with a mixed item type list of matching results. The mixed item type list may be ordered or filtered by item types. For example, when viewing a list of person entities in a text search results user interface, filters may allow the user to shortlist only those persons linked to a crime by an offender link.

Figure 4A:
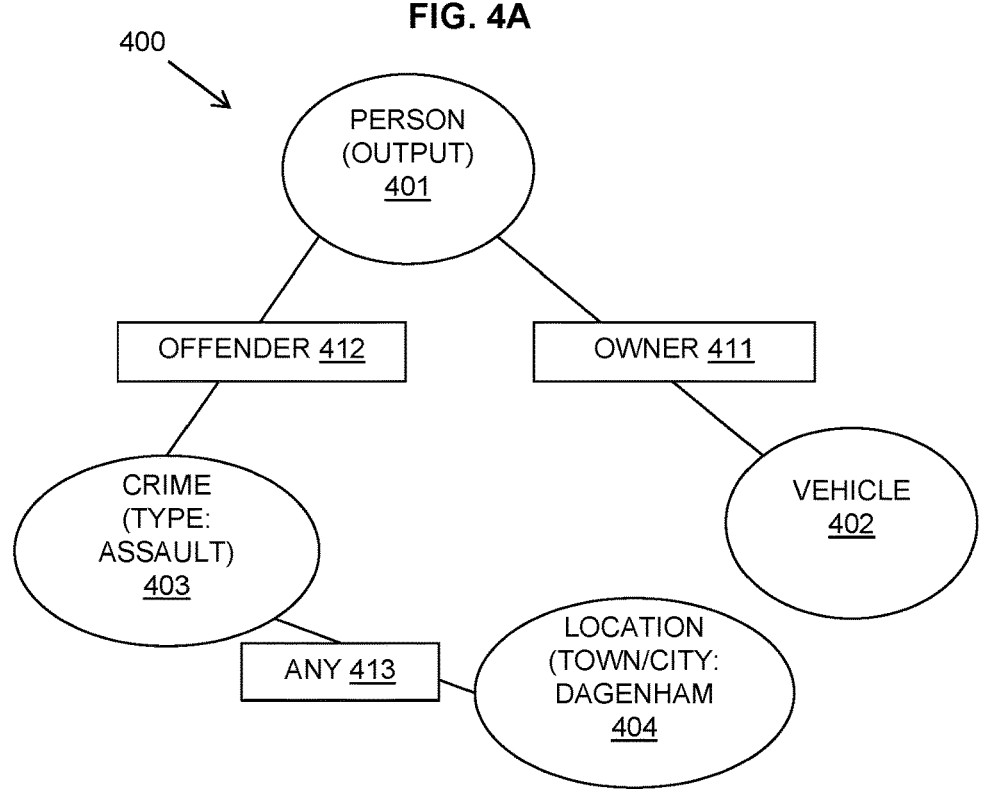
FIGS. 4A and 4B are schematic diagrams of an example query with FIG. 4B showing extracted relationships of interest in accordance with an aspect of the present invention.
Figure 4B:
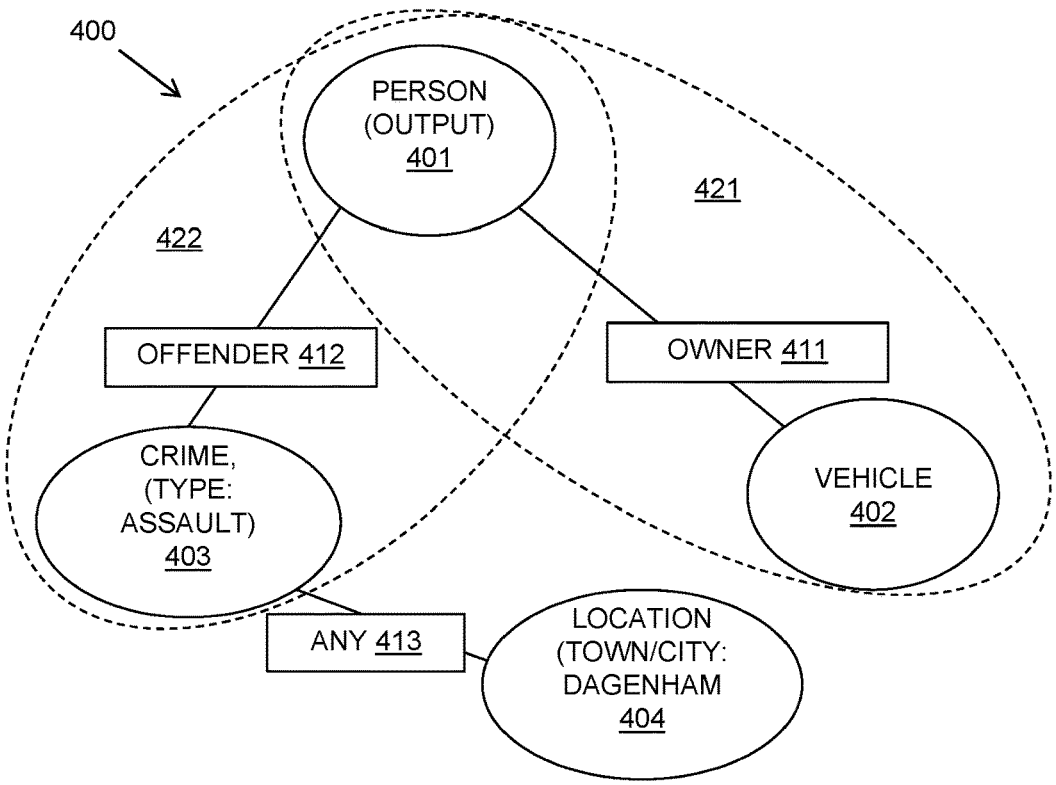

Referring to FIGS. 4A and 4B, in a data analysis environment, such as IBM i2 Analyze, a user may create and save queries 400 that may be re-run to find items of interest. These queries may be harvested to capture relationships between items that may be deemed interesting.

Referring to FIG. 4A a schematic diagram shows a query 400 including a person entity 401 that is designated as an output item. The query 400 will return person items 401 linked to a vehicle 402 by an owner link 411 and linked to a crime 403 in the form of an assault by an offender link 412, where the crime 403 is also linked to a specified location 404 of a town/city by any link type 413.

In FIG. 4A, the structure of the query 400 suggests the user is interested in persons 401 linked to assault crimes 403 by an offender link type 412 and also persons 401 who own 411 a vehicle 402.

Curating a list of these relationships of interest can inform a shortlist of advanced facets to be displayed from the potential list of 1000s. The creation and maintenance of a list of relationships of interest may be carried out by crawling the saved queries available to a given user as well as those created and run by that user.

All queries may be deconstructed into a list of dumbbells (i.e., a person entity linked to a crime entity). A dumbbell can be identified programmatically by finding each link and then identifying the entities at each end as entity creation is a precondition for creating a link. In a saved query, at least one item must be designated as the output of the query. In FIG. 4A, the person entity 401 is marked as the output. Output items may be interpreted as being of significant interest as the query is going to return items of these types to the user.

Applying the described method, the query 400 in FIG. 4A may be deconstructed to the dumbbells 421, 422 illustrated in FIG. 4B. As both of these dumbbells 421, 422 feature the designated output, in this case the person entity 401, they can both be considered relationships of interest. The relationship between the crime 403 and location 404 is not deemed of primary interest, as the user has not expressed an interest in being returned crimes or locations.

In this case, the relationships to be included in the list for person items are:
 1. Linked to vehicle by owner link; and
 2. Linked to crime of type. It may be noted the value of the crime type is not included in this embodiment. Some embodiments may take values such as the crime type into account, so that the relationship Person-Offender-Crime (Burglary) is recorded as interesting whereas the relationship Person-Offender-Crime (Vandalism) is not.

The value of these lists is realized when a user runs a basic keyword search and is presented with a mixed item type list of matching results. Upon filtering by "Person", facets can be generated with reference to the list of relationships of interest for that type.

Figure 5B:
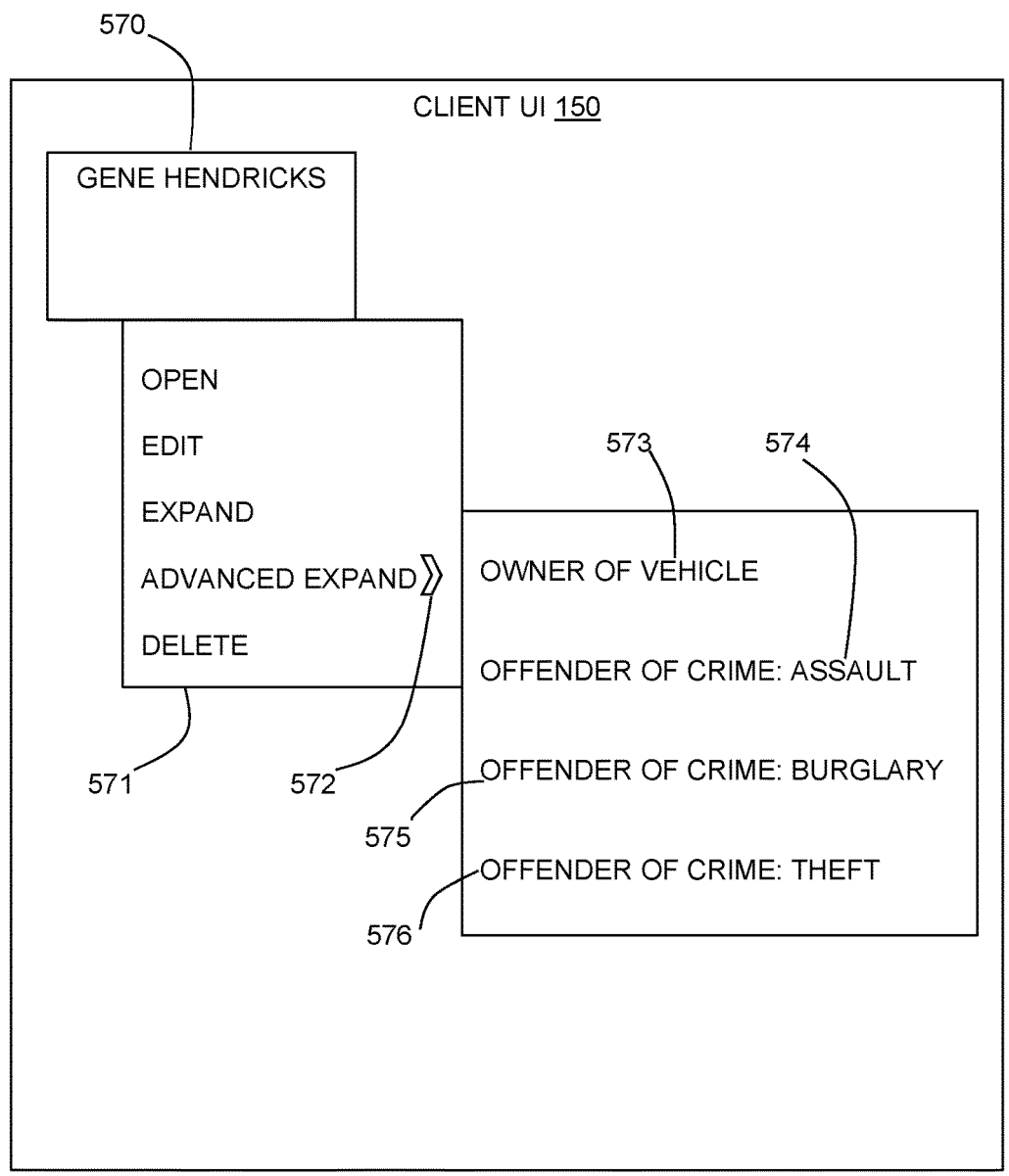

Referring to FIG. 5A a schematic diagram of options in the client UI 150 is shown for the person output. Standard facets 540 may be offered in the UI based on properties, for example, in the form of "Gender" 550 of "Male" 551 or "Female" 552, and "Nationality" 560 in the form of "British" 561 or "French" 562.

Advanced facets 510 may be offered in the UI to the user based on the relationships of interest. For example, an advanced facet of "Vehicle" 520 may include an option of "Owner of vehicle" 521 which may return results. As another example, an advanced facet of "Crime" 530 may include "Offender of crime: Assault" 531, "Offender of crime: Burglary" 532, and "Offender of crime: Theft" 533. These allow the user to filter the list not by properties of the person items, but by their relationships with other item types, all without user configuration or administrator overhead.

The method may provide automatic generation of suggested relationships of interest on link type, such as "Offender: Crime", and "Offender: Burglary". This may provide the ability to perform a filtered expand based on a relationship of interest on link type, "Offender: Crime", and "Offender: Burglary".

High performance of this pattern is supported by dumbbell indexing, an indexing strategy that can be powered by search platforms. Dumbbell indexing is supported by search platforms such as Solr (Solr is a trade mark of Apache Software Foundation) and allows an index to be constructed based on the connectivity of items. When a filter is applied, an expensive query does not have to be executed as the index can already provide the results.

In another embodiment, this list of relationships may be used to power an enhanced filtered expand of chart items. FIG. 5A shows an example embodiment of a display of the client UI 150 that illustrates how a user may select a person item, in this example "Gene Hendricks" 570 on a network chart. The user may be offered options 571 including the option of "Advanced Expand" 572. "Advanced Expand" 572 may expand to options such as "Owner of vehicle" 573, "Offender of crime: Assault" 574, "Offender of crime: Burglary" 575, and "Offender of crime: Theft" 576 in accordance with the list above.

Figure 6:
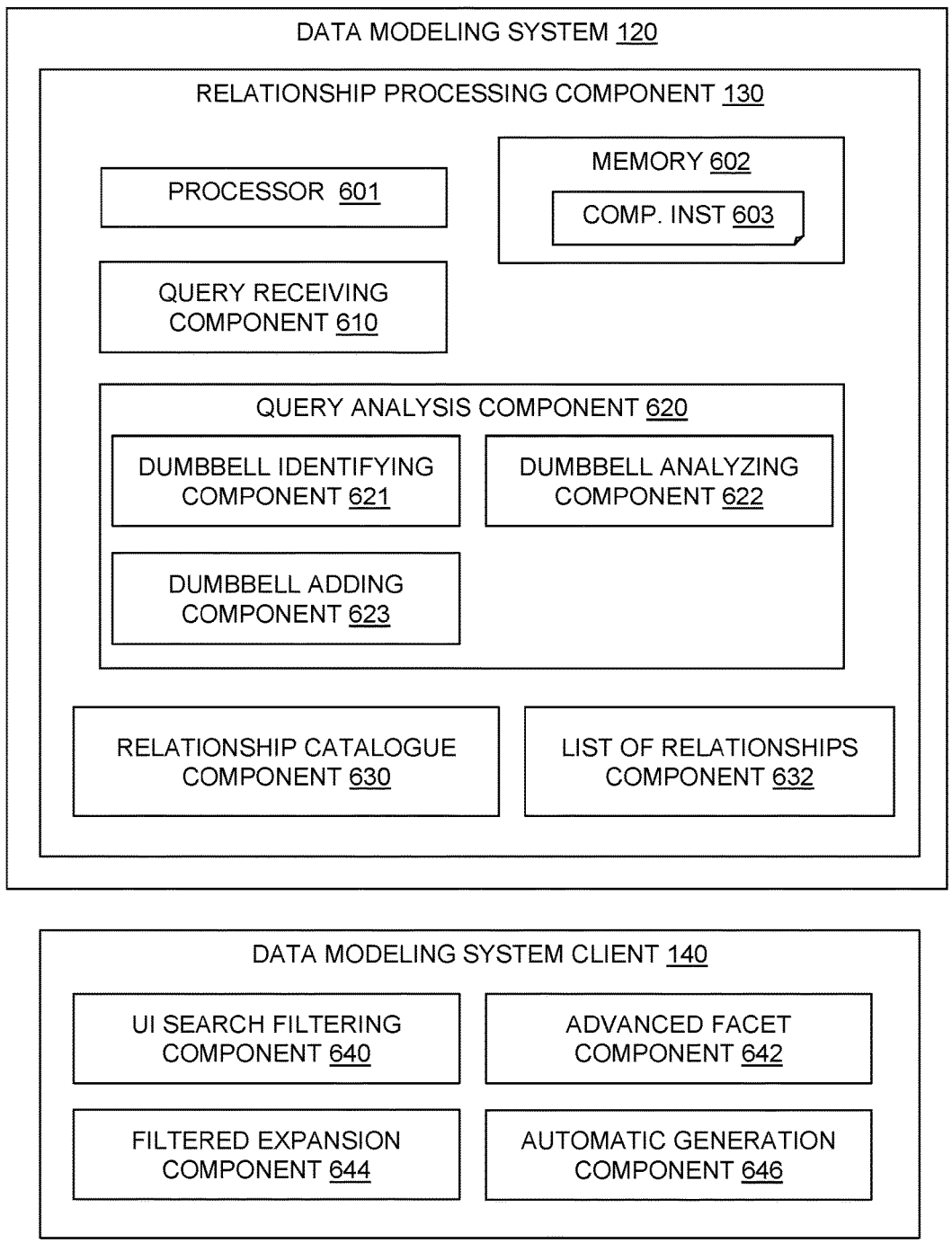
FIG. 6 is block diagram of an example embodiment of a system in accordance with the present invention.

Referring to FIG. 6, a block diagram shows an example embodiment of the described relationship processing component 130.

The relationship processing component 130 may include at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components.

As described in relation to FIG. 1, the relationship processing component 130 may be provided as associated with or integral to a data modeling system 120 which has access to one or more data sources.

The relationship processing component 130 may include a query receiving component 610 for receiving a user query as input and saved in a client UI of the relationship processing component 130. The query may include at least one output item identified by the query receiving component 610.

The relationship processing component 130 may include a query analysis component 620 for analyzing the received query. The query analysis component 620 may include a dumbbell identifying component 621 for identifying dumbbells in the query in the form of a link with entities at either end. The query analysis component 620 may include a dumbbell analyzing component 622 for examining a dumbbell to determine if the dumbbell includes an output item of the query.

The query analysis component 620 may further include a dumbbell adding component 623 for adding a dumbbell which includes an output item to a catalogue of relationships as maintained by a relationship catalogue component 630. The added dumbbell may include the link type and entity types.

The method may be repeated for each saved query so as to generate a list of relationships for each item type maintained by a list of relationships component 632. These lists may be used when a user runs a keyword search and is presented with a mixed item type list of matching results.

The data modeling system 120 may have a data modeling system client 140 for providing a user interface to a user. The data modeling system client 140 may include a user interface search filtering component 640 for using the list of relationships for filtering item types when a user runs a keyword search and is presented with a mixed item type list of matching results.

The data modeling system client 140 may also include an advanced facet component 642 for using the list of relationships for an item type to provide an advanced facet for searching at the user interface.

The data modeling system client 140 may also include a filtered expansion component 644 for providing a filtered expansion for an item type based on the list of relationships for the item type.

The data modeling system client 140 may also include an automatic generation component 646 for enabling automatic generation of suggested relationships of interest for an item type based on the list of relationships for the item type.

Figure 7:
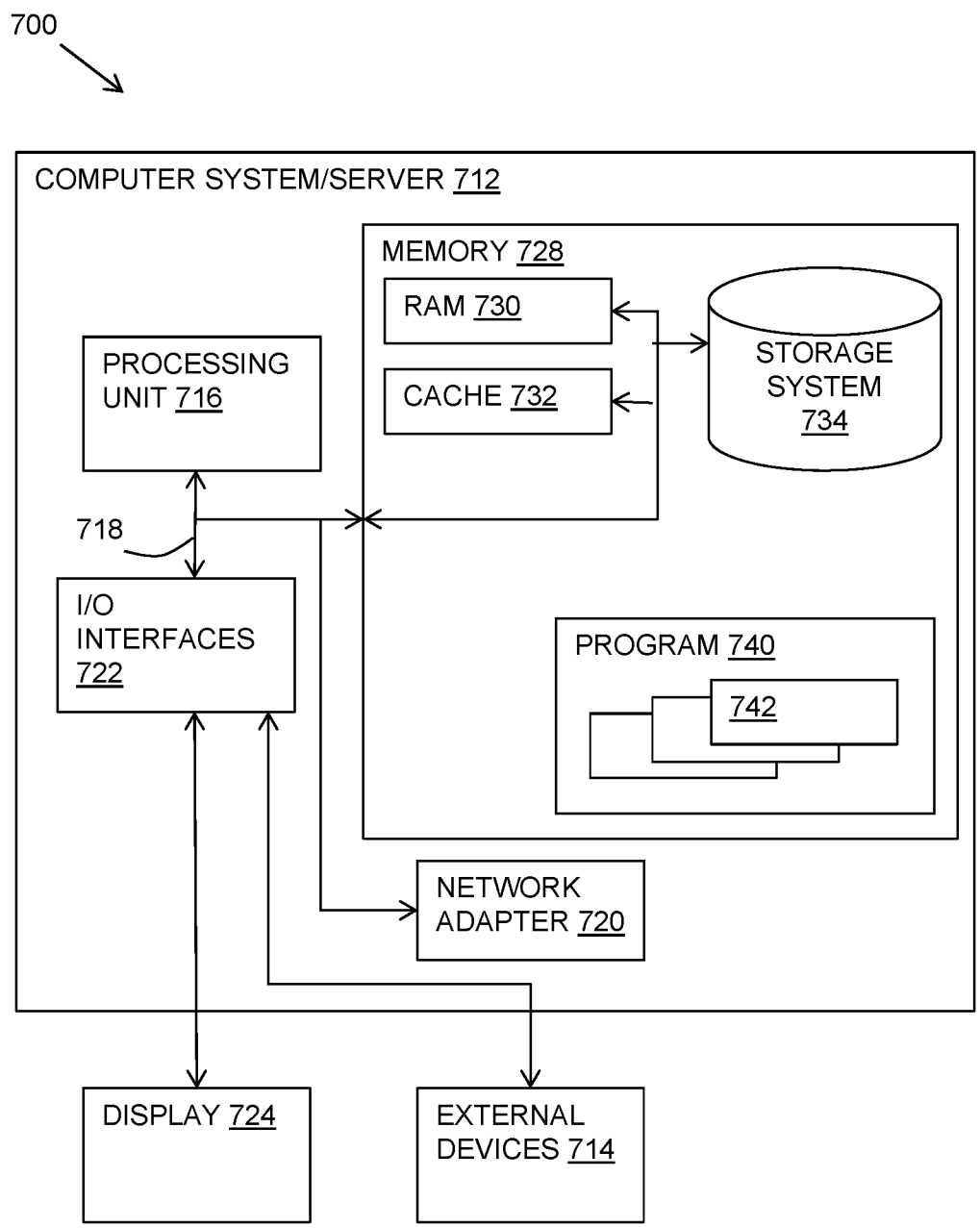
FIG. 7 is a block diagram of an embodiment of a computer system or cloud server in which the present invention may be implemented.

Referring now to FIG. 7, a schematic of an example of a system 700 in the form of a computer system or server is shown.

A computer system or server 712 may be operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

In FIG. 7, a computer system/server 712 is shown in the form of a general-purpose computing device. The components of the computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
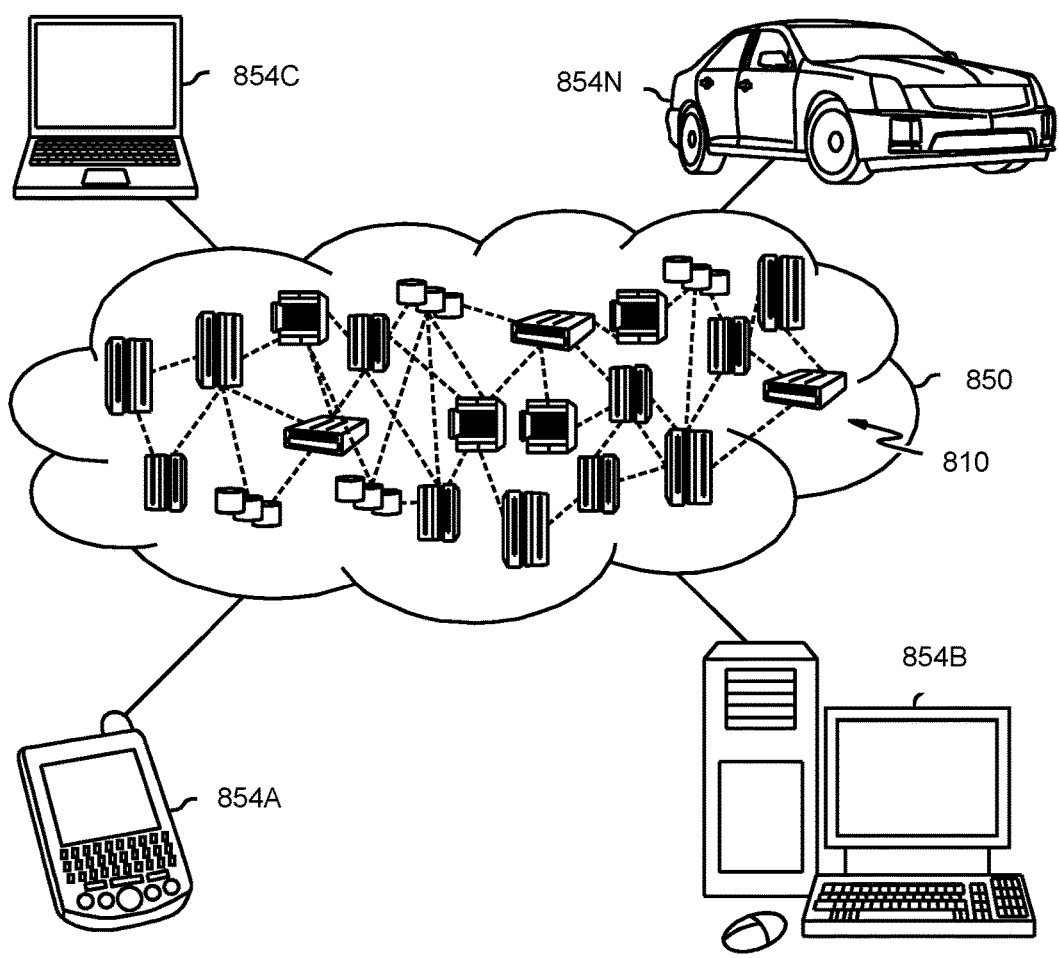
FIG. 8 is a schematic diagram of a cloud computing environment in which the present invention may be implemented.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
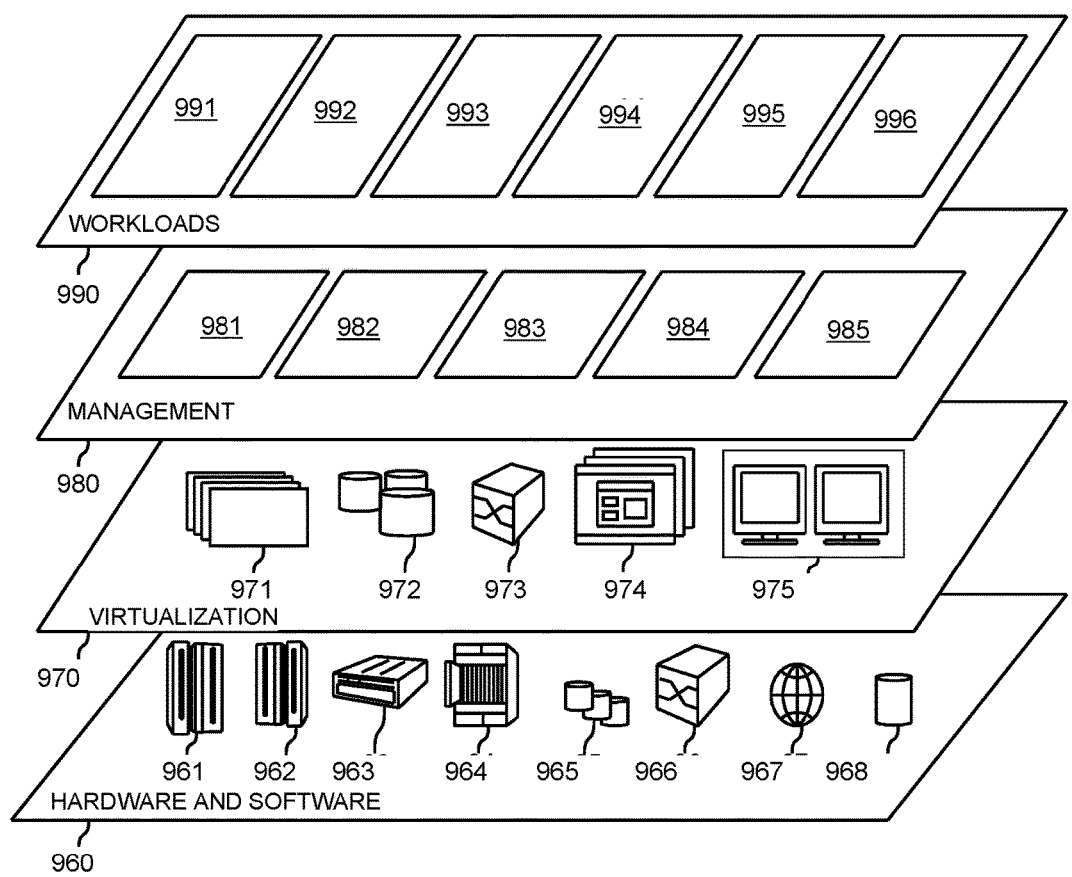
FIG. 9 is a diagram of abstraction model layers of a cloud computing environment in which the present invention may be implemented.

Referring now to FIG. 9, a set of functional abstraction layers provided by cloud computing environment 950 (FIG. 9) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provides pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and data model relationship processing 996.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

the invention claimed is:

1. A computer-implemented method for identifying relationships of interest of entities in a data modeling environment, wherein the data modeling environment represents objects as entities with links representing relationships between the entities, comprising:
   receiving a query, the query comprising two or more entities and one or more links with at least one of the entities or links designated as an output item, wherein the output item determines an item type that will be returned by a response to the query;
   analyzing, by a processor, the query to identify each dumbbell in the query, wherein a dumbbell is a link with a first entity at a first end of the link and a second entity at a second end of the link;
   examining, by the processor, each identified dumbbell to determine if the dumbbell includes the output item;
   discarding a first identified dumbbell not including the output item in response to the first identified dumbbell not including the output item;
   keeping a second identified dumbbell including the output item and discarding property values of items of the second identified dumbbell in response to the second identified dumbbell including the output item; and
   adding the second identified dumbbell to a catalogue of relationships including a link type and entity types of the dumbbell in response to the second identified dumbbell including the output item and in response to the catalogue of relationships not already listing a stored dumbbell having the link type and entity types, wherein the catalogue of relationships comprises a data structure storing relationships.

2. The method as recited in claim 1 further comprising:
   identifying each dumbbell in the query programmatically by finding each link and then identifying the entities at each end.

3. The method as recited in claim 1, wherein the query is a query saved by a user.

4. The method as recited in claim 1 further comprising:
   repeating said receiving, analyzing, examining and adding for multiple queries to generate a list of relationships for each item type.

5. The method as recited in claim 4 further comprising:
   using the list of relationships when a user runs a keyword search and is presented with a mixed item type list of matching results, wherein the list of relationships is used to filter item types.

6. The method as recited in claim 4 further comprising:
   using the list of relationships for a particular item type to provide an advanced facet for searching.

7. The method as recited in claim 4 further comprising:
   providing a filtered expansion for a particular item type based on the list of relationships for the particular item type.

8. The method as recited in claim 4 further comprising:
   enabling automatic generation of suggested relationships of interest for a particular item type based on the list of relationships for the particular item type.

9. The method as recited in claim 4, wherein the list of relationships is generated for all saved queries, wherein the list of relationships is used when a user runs a keyword search and is presented with a mixed item type list of matching results, wherein the mixed item type list is filtered by item types.

10. The method as recited in claim 1, wherein the items of the dumbbell comprise entities and links.

* * * * *